United States Patent
Hsiung

(10) Patent No.: US 8,411,424 B2
(45) Date of Patent: Apr. 2, 2013

(54) STRAP MOUNTING STRUCTURE AND ELECTRONIC DEVICE USING THE SAME

(75) Inventor: Ming-Chun Hsiung, Shindian (TW)

(73) Assignee: FIH (Hong Kong) Limited, Kowloon (HK)

( * ) Notice: Subject to any disclaimer, the term of this patent is extended or adjusted under 35 U.S.C. 154(b) by 297 days.

(21) Appl. No.: 12/903,316

(22) Filed: Oct. 13, 2010

(65) Prior Publication Data

US 2012/0050961 A1    Mar. 1, 2012

(30) Foreign Application Priority Data

Aug. 25, 2010   (CN) .......................... 2010 1 0262492

(51) Int. Cl.
*G06F 1/16* (2006.01)

(52) U.S. Cl. ................................ 361/679.02; 24/115 R

(58) Field of Classification Search ............. 361/679.02; 24/115 R, 15 R; 220/4.02

See application file for complete search history.

(56) References Cited

U.S. PATENT DOCUMENTS

| | | | | |
|---|---|---|---|---|
| 6,536,621 | B2 * | 3/2003 | Yokobori | 220/4.02 |
| 6,655,540 | B2 * | 12/2003 | Shimoda et al. | 220/4.02 |
| 7,715,192 | B2 * | 5/2010 | Takahama | 361/679.59 |
| 7,780,047 | B2 * | 8/2010 | Chen et al. | 224/218 |
| 7,929,297 | B2 * | 4/2011 | Chen | 361/679.56 |
| 8,068,332 | B2 * | 11/2011 | Yang et al. | 361/679.01 |
| 8,194,405 | B2 * | 6/2012 | Dong | 361/679.58 |
| 8,199,492 | B2 * | 6/2012 | Liang et al. | 361/679.56 |
| 8,224,404 | B2 * | 7/2012 | Yang et al. | 455/575.1 |
| 2010/0033911 | A1 * | 2/2010 | Chang et al. | 361/679.01 |
| 2010/0035666 | A1 * | 2/2010 | Chang et al. | 455/575.1 |
| 2010/0102576 | A1 * | 4/2010 | Zhang | 292/261 |
| 2010/0118476 | A1 * | 5/2010 | Li | 361/679.01 |

* cited by examiner

*Primary Examiner* — Lisa Lea Edmonds

(74) *Attorney, Agent, or Firm* — Altis Law Group, Inc.

(57) ABSTRACT

A strap mounting structure is used for assembling a strap. The strap mounting structure includes a first plate and a second plate. The first plate defines through holes. The second plate is assembled to the first plate. The second plate defines a guiding chamber for guiding the strap from entering into one through hole and exiting from another one through hole.

17 Claims, 3 Drawing Sheets

STRAP MOUNTING STRUCTURE AND ELECTRONIC DEVICE USING THE SAME

BACKGROUND

1. Technical Field

The present disclosure relates to mounting structures for straps and electronic devices using the strap mounting structures.

2. Description of Related Art

Electronic devices such as mobile phones, personal digital assistants, handheld computers, generally include interconnected holes to thread/support a strap. Usually, the housing is made of plastic. When making the housing, a mold must include two elements to make the interconnected holes. Therefore, the mold structure may be more complicated. If the housing is made of metal, the manufacture becomes even more difficult.

Therefore, there is room for improvement within the art.

BRIEF DESCRIPTION OF THE FIGURES

Many aspects of the strap mounting structure and electronic device using the same can be better understood with reference to the following figures. The components in the figures are not necessarily drawn to scale, the emphasis instead being placed upon clearly illustrating the principles of the strap mounting structure and electronic device using the same. Moreover, in the drawings like reference numerals designate corresponding parts throughout the several views.

DETAILED DESCRIPTION

Figure 1:
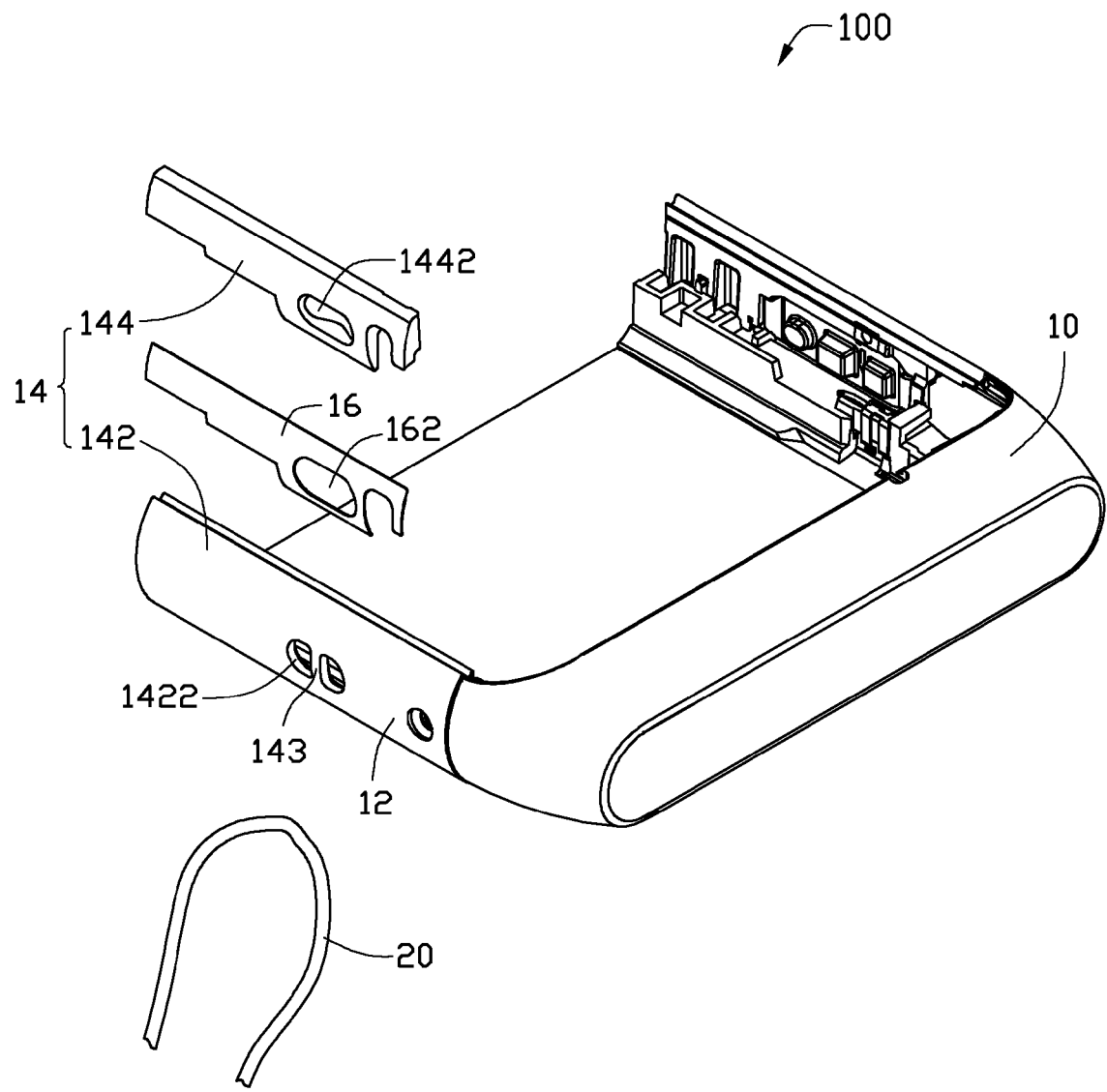
FIG. 1 is an exploded, isometric view of an exemplary embodiment of a strap mounting structure used to an electronic device.
Figure 3:
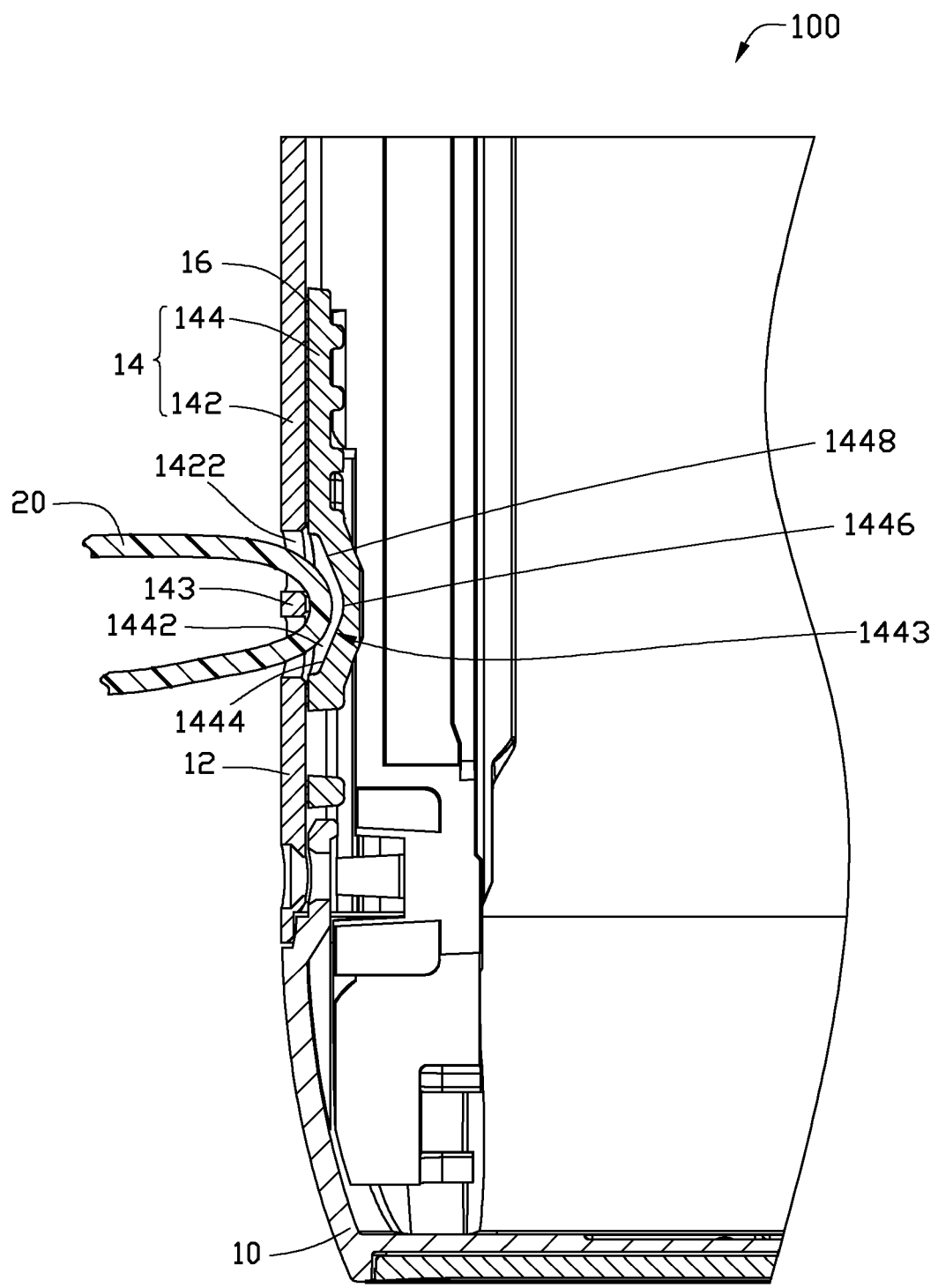
FIG. 3 is a cross-sectional view of the electronic device of FIG. 2 taken along line III-III.

FIG. 1 shows an exemplary electronic device 100 including a housing 10 and a strap 20 attached on the housing 10. The housing 10 includes a sidewall 12 and a strap mounting structure 14. The strap mounting structure 14 includes a first plate 142 and a second plate 144. In this exemplary embodiment, the first plate 142 is a part of the sidewall 12 of the electronic device 100. Through holes 1422 are defined in the first plate 142, and a rib 143 is formed on the first plate 142 between each pair of adjacent through holes 1422. One end of the strap 20 can pass through one of the through holes 1422, and extend out from another of the through holes to allow the strap 20 to be attached to the rib 143 of the electronic device 100. The second plate 144 is attached to an inside of the first plate 142. The second plate 144 defines a guiding chamber 1442. Referring to FIG. 3, the guiding chamber 1442 includes a smooth curved bottom wall 1443 with a first guiding portion 1444, a second guiding portion 1448, and a connecting portion 1446 connecting the first guiding portion 1444 to the second guiding portion 1448. The bottom wall 1443, in this exemplary embodiment, is substantially V-shaped. The first guiding portion 1444 and the second guiding portion 1448 are oriented at an obtuse angle therebetween. The connecting portion 1446 is curved-shape for guiding the strap 20 to slide from the first guiding portion 1444 to the second guiding portion 1448. The first guiding portion 1444 faces one of the through holes 1422, and the second guiding portion 1448 faces another of the through holes 1422. When the strap 20 is inserted into one of the through holes 1422, a free end of the strap 20 is guided by the first guiding portion 1444 and slides obliquely downward along the first guiding portion 1444. After resisting the connecting portion 1446, the free end of the strap 20 can slide obliquely upward along the second guiding portion 1448 and exit from another of the through holes 1422.

Figure 2:
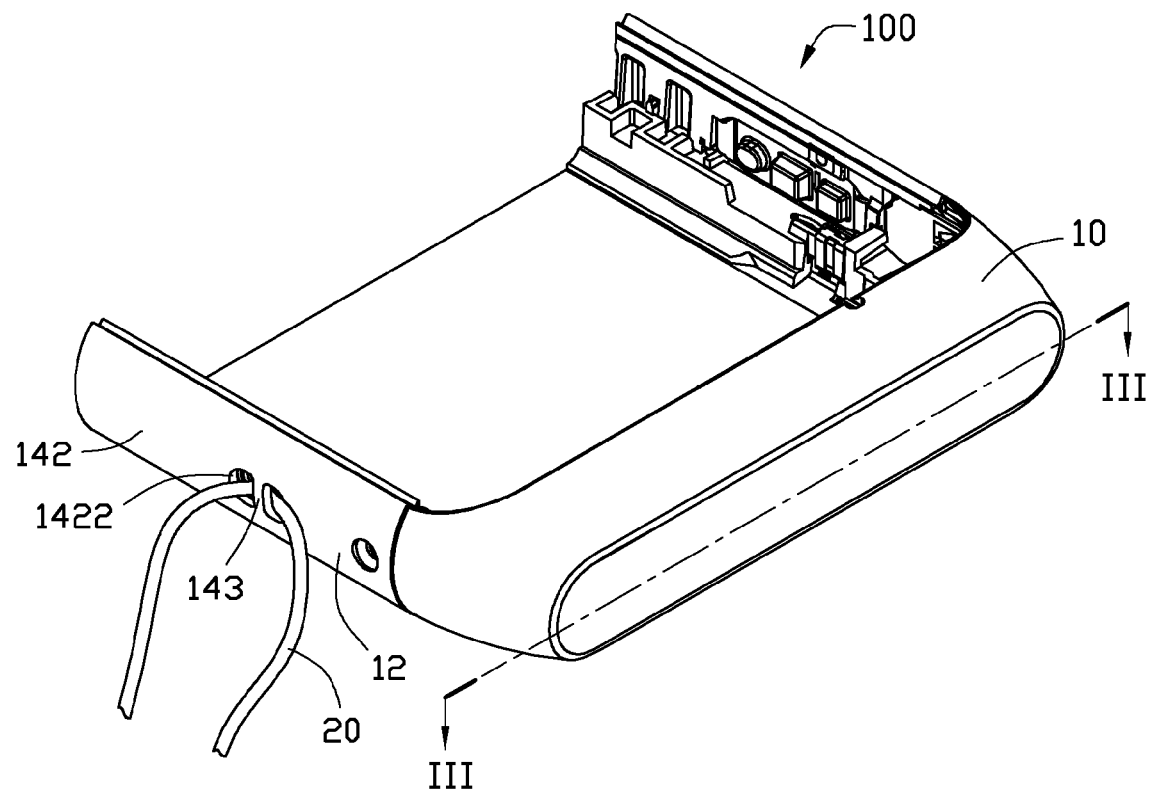
FIG. 2 is an assembled, isometric view of the electronic device.

Referring to FIG. 2, when the strap mounting structure 14 is to be assembled, a double faced adhesive tape 16 is provided. The double faced adhesive tape 16 defines an opening 162 corresponding to the guiding chamber 1442. The double faced adhesive tape 16 is adhered to the second plate 144, and the opening 162 is aligned with the guiding chamber 1442. The guiding chamber 1442 is aligned with the through holes 1422, and the second plate 144 is adhered to the sidewall 12. Thus, the strap mounting structure 14 is assembled to the first plate 142.

Referring to FIG. 3, when the strap 20 is to be assembled to the housing 10, the free end of the strap 20 enters into one of the through holes 1422. The strap 20 resists the bottom wall 1443 of the guiding chamber 1442 and slides along the first guiding portion 1444, the connecting portion 1446, the second guiding portion 1448, and finally exits from another of the through holes 1422. Thus, the strap 20 is attached to the rib 143 of the electronic device 100.

The strap mounting structure 14 only includes a first plate 142 and a second plate 144, thus, the strap mounting structure 14 is simple. The guiding chamber 1442 includes the smooth curved bottom wall 1443 for guiding the strap 20 entering into one of the through holes 1422 and exiting from another of through holes 1422, thus, it is easy to assemble the strap 20 to the housing 10.

It should be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A strap mounting structure for holding a strap, the strap mounting structure comprising:
   a first plate defining through holes and forming a rib between each pair of adjacent through holes; and
   a second plate assembled to the first plate, the second plate defining a guiding chamber aligned with the through holes, the guiding chamber comprising a bottom wall curved toward a direction away from the rib, the bottom wall comprises a first guiding portion, a second guiding portion, and a connecting portion connecting the first guiding portion to the second guiding portion;
   wherein the connecting portion away from the rib is curved-shape for guiding the strap to slide from the first guiding portion to the second guiding portion.

2. The strap mounting structure as claimed in claim 1, wherein the first guiding portion faces one of the through holes, and the second guiding portion faces another of the through holes.

3. The strap mounting structure as claimed in claim 2, wherein the first guiding portion and the second guiding portion cooperatively define an obtuse angle therebetween.

4. The strap mounting structure as claimed in claim 1, wherein the second plate is assembled to the first plate by a double faced adhesive tape.

5. The strap mounting structure as claimed in claim 4, wherein the double faced adhesive tape defines an opening corresponding to the guiding chamber.

6. The strap mounting structure as claimed in claim 1, wherein the first plate is made of metal.

7. A strap mounting structure for assembling a strap, the strap mounting structure comprising:
- a first plate defining through holes;
- a second plate assembled to the first plate, the second plate defining a guiding chamber for guiding the strap from entering into one of the through holes and exiting from another of the through holes;
  - wherein the guiding chamber comprises a bottom wall curved toward a direction away from the through holes, the bottom wall comprises a first guiding portion, a second guiding portion, and a connecting portion connecting the first guiding portion to the second guiding portion; the connecting portion away from the through holes is curved-shape for guiding the strap to slide from the first guiding portion to the second guiding portion.

8. The strap mounting structure as claimed in claim 7, wherein the first guiding portion faces one of the through holes, and the second guiding portion faces another of the through holes.

9. The strap mounting structure as claimed in claim 8, wherein the first guiding portion and the second guiding portion cooperatively define an obtuse angle therebetween.

10. The strap mounting structure as claimed in claim 7, wherein the second plate is assembled to the first plate by a double faced adhesive tape.

11. The strap mounting structure as claimed in claim 10, wherein the double faced adhesive tape defines an opening corresponding to the guiding chamber.

12. The strap mounting structure as claimed in claim 7, wherein the first plate is made of metal.

13. The strap mounting structure as claimed in claim 7, wherein a rib is formed on the first plate between each pair of adjacent through holes, the strap is attached to the rib.

14. An electronic device, comprising:
- a first plate defining through holes;
- a strap; and
- a second plate assembled to the first plate, the second plate defining a guiding chamber for guiding the strap from entering into one through hole and exiting from another of the through holes;
  - wherein the guiding chamber comprises a bottom wall curved toward a direction away from the through holes, the bottom wall comprises a first guiding portion, a second guiding portion, and a connecting portion connecting the first guiding portion to the second guiding portion; the connecting portion away from the through holes is curved-shape for guiding the strap to slide from the first guiding portion to the second guiding portion.

15. The electronic device as claimed in claim 14, wherein the first guiding portion faces one of the through holes, and the second guiding portion faces another of the through holes.

16. The electronic device as claimed in claim 15, wherein the first guiding portion and the second guiding portion cooperatively define an obtuse angle therebetween.

17. The electronic device as claimed in claim 14, wherein a rib is formed on the first plate between each pair of adjacent through holes, the strap is attached to the rib.

* * * * *